United States Patent [19]

Hautau et al.

[11] Patent Number: 4,801,240
[45] Date of Patent: Jan. 31, 1989

[54] ROBOT COMPLIANCE APPARATUS

[76] Inventors: Charles F. Hautau, 146 Hilltop Rd., Oxford, Ohio 45056; Michael W. Schmidt, 2772 Hunters Way, Bloomfield Hills, Mich. 48013; David L. Fleischman, 6231 Rivercliff La., Dayton, Ohio 45449

[21] Appl. No.: 17,048

[22] Filed: Feb. 19, 1987

[51] Int. Cl.[4] .................................................. B25J 17/02
[52] U.S. Cl. ................................. 414/735; 248/287; 403/67; 901/45
[58] Field of Search ............... 901/45; 414/730, 735; 267/64.11, 166, 169, 174; 74/411, 470, 562; 403/63, 80; 248/274, 287

[56] References Cited

U.S. PATENT DOCUMENTS

| 2,058,575 | 10/1936 | Drude | 267/174 X |
|---|---|---|---|
| 2,512,010 | 6/1950 | Caputo | 74/411 X |
| 3,870,287 | 3/1975 | McMahon | 267/64.11 X |
| 4,076,131 | 2/1978 | Dahlstrom et al. | 901/9 X |
| 4,216,878 | 8/1980 | Naud | 267/171 X |
| 4,393,907 | 7/1983 | Kronstadt | 267/174 X |
| 4,400,885 | 8/1983 | Consales | 901/45 X |
| 4,447,048 | 5/1984 | Fischer | 901/45 X |

FOREIGN PATENT DOCUMENTS 0639701 11/1978 U.S.S.R. ................................. 901/45

Primary Examiner—Robert J. Spar
Assistant Examiner—Donald W. Underwood
Attorney, Agent, or Firm—Jacox & Meckstroth

[57] ABSTRACT

Robotic tooling is connected to a robot arm with a device including a set of support members connected together to provide for relative axial movement and rotary movement of the tooling in addition to relative lateral movement in two perpendicular directions from a home or normal position. The members are biased to a precise normal position by pressure biased telescopic plungers confined within mating and opposing recesses, and a set of linear transducers sense movement along each of the three axes and also rotary movement to provide a feedback for the robot control.

9 Claims, 1 Drawing Sheet

U.S. Patent    Jan. 31, 1989    4,801,240
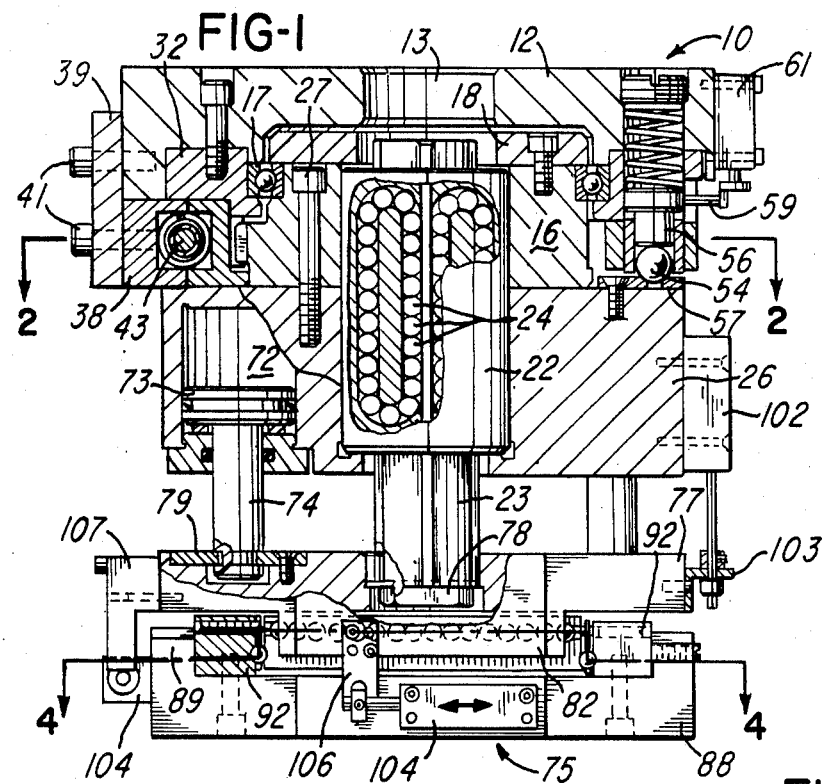
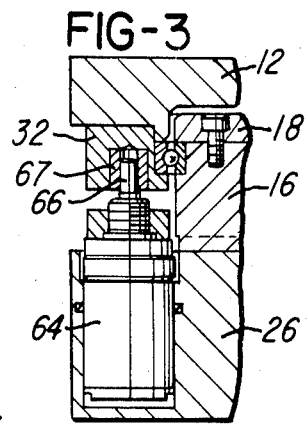
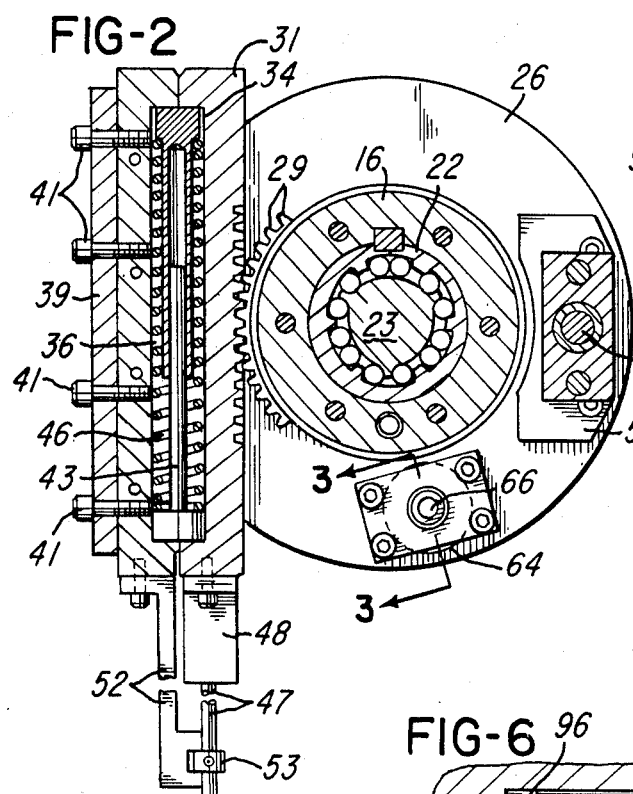
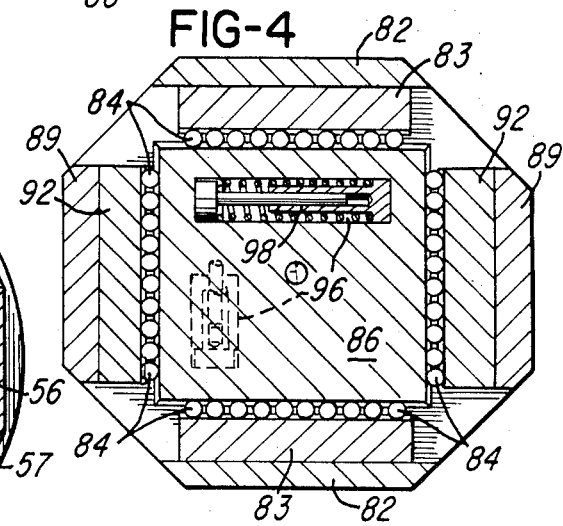
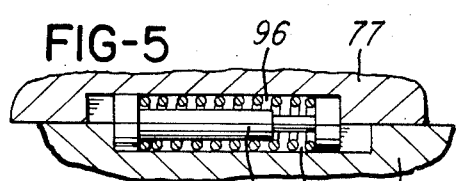
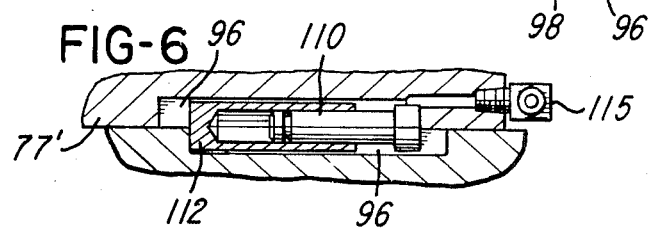

4,801,240

ROBOT COMPLIANCE APPARATUS

BACKGROUND OF THE INVENTION

In the automated assembly of parts with power operated robots, it is sometimes necessary to provide the part pick-up mechanism with limited movement relative to the robot arm in order for the part to become properly aligned with the stationary member or component which receives the part. To provide such movement, the part pick-up and transfer tooling is connected to the robot arm with a compliance device or apparatus which compensates for misalignment between parts during the assembly operation. One form of such robot compliance device or apparatus is produced by Barry Wright Corporation and sold under the trademark "MODEL AST-100 ACCOMMODATOR". This device incorporates elastomeric pads to provide for limited movement between components or members so that the part engaging and transfer tooling may shift to compensate for misalignment. With such compliance device or apparatus, it is frequently desirable to provide for relative movement on three separate axes and sometimes in rotary directions from a precision home or normal position. It is also desirable to provide for sensing the movement in each direction as well as rotary movement from the home position to provide a feedback for the robot control system.

SUMMARY OF THE INVENTION

The present invention is directed to an improved compliance device or apparatus adapted for use on a robot for connecting part transfer tooling to the robot arm and which provides all of the desirable features mentioned above. In general, the apparatus of the invention includes a first support member and a second support member which are connected by means providing for non-rotatable axial movement of the second support member relative to the first suppot member. The first support member includes first and second sections which are connected for relative rotation, and a rack and pinion device bias the second section to a precise normal position relative to the first section. A set of fluid pistons bias the second support member axially to a home or normal axial position relative to the first support member, and the second support member incorporates first and second sections coupled together by a set of linear bearings and square bearing block to provide for precision X-Y movement of the second section relative to the first section. A set of pressure actuated collapsible plungers are confined within mating recesses to bias the second section to a precision home or normal position relative to the second section. A set of linear transducers are connected between the various sections to provide for sensing linear and rotary movements between the sections.

Other features and advantages of the invention will be apparent from the following description, the accompanying drawing and the appended claims.

BRIEF DESCRIPTION OF THE DRAWINGS

FIG. 1 is an elevational view of compliance apparatus constructed in accordance with the invention and with a major portion of the apparatus shown in axial section;

FIG. 2 is a section of the apparatus as taken generally on the line 2—2 of FIG. 1;

FIG. 3 is a fragmentary section taken generally on the line 3—3 of FIG. 2;

FIG. 4 is a broken section taken generally on the line 4—4 of FIG. 1;

FIG. 5 is an enlarged fragmentary section of a portion shown in FIG. 4; and

FIG. 6 is a fragmentary section similar to FIG. 5 and showing a modification of the apparatus.

DESCRIPTION OF THE PREFERRED EMBODIMENTS

The compliance apparatus illustrated in FIGS. 1-5 includes a first support member 10 which is adapted to be connected to the arm of a robot and includes a square head member or section 12 having a center opening 13. The section 12 supports an annular pinion or member 16 for rotation by an anti-friction bearing 17 secured by a retainer ring 18. An anti-friction linear bearing 22 is supported by the annular member 16 and includes an axially moveable splined shaft 23 which is prevented from rotation by a set of recirculating balls 24 within the bearing 22.

A cylindrical ring or section 26 is secured to the member 16 by a set of screws 27, and ring member 16 has an arcuate section of gear teeth 29 to form a partial pinion. The gear teeth 29 mesh with corresponding teeth on an elongated rack 31 which is supported for longitudinal movement between the ring section 26 and a ring element 32 secured to the head section 12.

The rack 31 defines an elongated cavity or recess 34 which mates with and opposes a corresponding recess 36 within an elongated guide rail 38 secured to the section 12 by a plate 39 and a set of screws 41. The mating and opposing recesses 34 and 36 confine an elongated collapsible or telescopic plunger 43 which has square end head portions. The plunger 43 is biased or urged to an extended position by a compression sping 46. The spring-biased plunger 43 maintains the rack 31 and the rings 16 and 26 in a predetermined home or normal position. When the section 26 rotates relative to the section 12 in either direction, the rack 31 shifts relative to the rail 38 to compress the spring 46, as illustrated in FIG. 5 which will be described later. The spring-biased plunger 43 returns the section 26 to a precision home or normal position, as shown in FIG. 2.

A linear transducer 48 (FIG. 2) is mounted on the rack 31 and has actuator pin 47 which is connected to the rail 38 by a bracket 52 and adjustable collar 53. The transducer 48 provides an electrical output which varies in response to axial movement of the pin 49 when the section 26 rotates in either direction relative to the section 12. The annular section 26 is retained in its home position by a detent ball 54 (FIG. 1) which is urged downwardly by a spring-biased plunger 56 into a recess formed within an arcuate plate 57 secured to the annular section 26. A pin 59 projects laterally from the plunger 56 and actuates a control switch 61 when the plunger 56 moves upwardly in response to the ball 54 being cammed upwardly from its recess within the plate 57. As shown in FIG. 3, a remotely controlled actuator 64 is carried within the ring section 26 and has a pin 66 which may be shifted upwardly into a bushing 67 within the ring 32 to lock the annular section 26 in its home or normal position and thereby prevent rotation of the section 26 relative to the head section 12.

The annular section 26 defines a set of four equally spaced fluid cylinder chambers 72 which receive a corresponding set of pistons 73 connected by corresponding rods 74 to a second support member 75. The second support member includes an upper or first support section 77 which is secured to the shaft 23 by a retaining plate 78 and is secured to the rods 74 by corresponding retaining plates 79. The section 77 has downwardly projecting parallel side rails 82 (FIG. 4) which confine a pair of bearing blocks 83. The blocks 83 form the outer races for a first pair of parallel spaced linear anti-friction bearings 84 which support a square bearing block or core member 86 for linear movement in a lateral direction or on a Y axis.

The support member 75 also includes a lower section 88 which has upwardly projecting parallel spaced side rails 89 for confining a pair of parallel spaced bearing blocks 92. Another pair of anti-friction linear bearings 84 are confined between the bearing blocks 92 and the corresponding opposite sides of the square bearing block 86 and support the section 88 for precision linear movement in a perpendicular direction or along an X axis. Thus the bottom section 88 is supported for vertical or axial movement by the linear bearing 22, for rotary movement by the ring 16 and for X-Y movement in perpendicular lateral directions by the upper section 77, the linear bearings 84 and the center bearing block 86.

Referring to FIGS. 4 and 5, the upper surface of the bearing block 86 and the lower surface of the support section 77 are formed with mating and opposing elongated recesses 96, and a spring-biased collapsible or telescopic plunger 98 is confined within the recesses 96 to establish a precise home or normal position for the support section 88 on the Y axis. FIG. 5 illustrates the bearing block 86 shifted laterally on the Y axis relative to the support section 77 and with the spring-biased plunger 98 being compressed or partially collapsed. FIG. 4 illustrates the bearing block 86 in its home or normal position when the square head portions of the plunger 98 engage both ends of the two opposing recesses 96. As illustrated in phantom in FIG. 4, another set of recesses 96 are formed within the bottom surface of the bearing block 86 and the top surface of the bottom support section 88 and extend perpendicular to the first set of recesses 96 for receiving another spring-biased plunger 98 for biasing the support section 88 to its home or normal position on the X axis.

As shown in FIG. 1, a linear transducer 102 and bracket 103 are connected between the sections 26 and 77 to sense vertical or axial movement of the support section 88, and another pair of linear transducers 104 and corresponding brackets 106 and 107 are connected to sense movement of the support section 88 on the X axis and on the Y axis. The transducers 102 and 104 provide a feedback to the robot control system.

From the drawing and the above description, it is apparent that compliance apparatus constructed in accordance with the present invention, provides desirable features and advantages. As one feature, the apparatus provides for precision movement of the support section 88 relative to the support section 12 along three separate and independent axes and provides for returning the support section 88 to a precision home or normal position after the section 88 has been shifted along one or more of the three axes. In addition, the transducers 102 and 104 provide for an electrical feedback which can be used to control or adjust the operation of the robot. The apparatus also provides for rotary movement of the support section 88 in both clockwise and counterclockwise directions from a precision home or normal position as established by the rack 31 and the captured spring-biased plunger 43. The fluid pressure within the cylinder chambers 72 may also be adjusted to adjust the force when the support section 88 will move axially or upwardly relative to the top head section 12.

When it is desirable to provide for adjusting the biasing pressure exerted by the pressure actuated plungers 43 and 98, each of the spring-biased plungers may be replaced by a fluid actuated plunger as illustrated, for example, by the modification shown in FIG. 6. In this modification, telescopic plunger elements 110 and 112 are urged or biased apart by a pressure controlled fluid supplied to the element 110 through a passage within the section 77' and connected to a fluid supply fitting 115.

While the form of compliance apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus adapted for connecting tooling to the moveable arm of a robot to provide for precision alignment of a part to be assembled, comprising a first support member adapted to be attached to the arm of a robot, a second support member adapted to be attached to the tooling, means connecting said first and second support members and providing for axial movement of said second support member relative to said first support member, fluid actuated means for biasing said second support member axially to a normal position relative to said first support member, said second support member including first and second support sections separated by a core member, bearing means supporting said core member and said second support section for lateral movement of said second support section in two perpendicular linear directions relative to said first support section, linear moveable biasing means for urging said second support section to a home position relative to said first support section, said linear moveable biasing means including a set of elongated opposing recesses in said first support section and in said core member and a set of elongated opposing recesses in said second support section and in said core member, each of said recesses having opposite ends, a pressure biased collapsible plunger within each set of opposing recesses and having opposite end portions engaging said opposite ends of said recesses to form precision said home position, and electrical control means for sensing movement of said second support member in said axial direction from said normal position and for sensing movement of said second support section laterally in each of said perpendicular directions from said home position relative to said first support section.

2. Apparatus as defined in claim 1 wherein said first support member includes a first section and a second section supported for substantial rotation relative to said first section, means including a rack and pinion for biasing said second section to a normal rotational position relative to said first section, and electrical control means for sensing movement of said rack and corresponding rotation of said second section of said first support member relative to said first section.

3. Apparatus as defined in claim 2 and including power actuated retractable means for locking said second section against rotation relative to said first section.

4. Apparatus as defined in claim 1 wherein said fluid actuated means comprise a plurality of angularly spaced and axially extending pistons connecting said first and second support members.

5. Apparatus as defined in claim 2 and including releasable spring-biased detent means for retaining said second section of said first support member at said normal position, and control means for sensing movement of said detent means when said second section of said first support member moves from said normal position.

6. Apparatus adapted for connecting tooling to the moveable arm of a robot to provide for precision alignment of a part to be assembled, comprising a first support member adapted to be attached to the arm of a robot, a second support member adapted to be attached to the tooling, means connecting said first and second support members and providing for axial and rotatable movement of said second support member relative to said first support member, fluid actuated means for biasing said second support member axially to a normal position relative to said first support member, said first support member including first and second support sections with said second section supported for rotation relative to said first section, said second support member including first and second support sections separated by a core member, bearing means supporting said core member and said second support section of said second support member for lateral movement of said second support section in two perpendicular linear directions relative to said first support section, linear moveable biasing means for urging said second support section of each said support member to home position relative to said first support section of said support member, said linear moveable biasing means including means defining a set of elongated opposing recesses for said first and second sections of said first support member and corresponding recesses for said first and second support sections of said second support member and said core member, each of said recesses having opposite ends, a pressure biased collapsible plunger within each set of opposing recesses and having opposite end portions engaging said opposite ends of said recesses to form a precision said home position, and electrical control means for sensing movement of said second support member in said axial direction from said normal position and for sensing movement of said second support section laterally in each of said perpendicular directions from said home position relative to said first support section.

7. Apparatus as defined in claim 6 wherein said means for biasing said second support member to said normal rotational position comprise a pinion portion engaging a linear moveable rack, said first support portion including a member cooperating with said rack to define said opposing elongated recesses, and one of said pressure biased collapsible plungers within said opposing recesses for establishing said normal position.

8. Apparatus as defined in claim 6 wherein said linear moveable biasing means for said second section of said first support member includes a rack and pinion, and electrical control means for sensing movement of said rack and corresponding rotation of said second section of said first support member relative to said first section.

9. Apparatus as defined in claim 8 and including releasable spring-biased detent means for retaining said second section of said first support member at said home position, and control means for sensing movement of said detent means when said second section of said first support member moves from said home position.

* * * * *